(12) United States Patent
Toas et al.

(10) Patent No.: US 7,060,148 B2
(45) Date of Patent: Jun. 13, 2006

(54) METHOD AND APPARATUS FOR ADHERING TOGETHER LANES OF COMPRESSIBLE PRODUCTS

(75) Inventors: Murray S. Toas, Norristown, PA (US); Dave Suda, Warrington, PA (US); Thomas A. Cuthbertson, Royersford, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 10/779,181

(22) Filed: Feb. 11, 2004

(65) Prior Publication Data

US 2005/0173060 A1    Aug. 11, 2005

(51) Int. Cl.
*B29C 65/00* (2006.01)

(52) U.S. Cl. ............... 156/152; 156/304.1; 156/304.5; 156/433; 156/502; 156/556

(58) Field of Classification Search ............... 156/152, 156/304.1, 304.5, 304.7, 264, 271, 433, 502, 156/556; 52/404.4

See application file for complete search history.

(56) References Cited

U.S. PATENT DOCUMENTS

| | | | |
|---|---|---|---|
| 1,238,356 A | | 8/1917 | Stokes |
| 3,070,475 A | * | 12/1962 | Carlson, Jr. et al. ........ 428/119 |
| 3,615,994 A | * | 10/1971 | MacLaine et al. .......... 156/159 |
| 3,812,002 A | | 5/1974 | Lurie |
| 3,910,145 A | | 10/1975 | Bender et al. |
| 3,958,385 A | | 5/1976 | Bondra, Jr. et al. |
| 3,964,232 A | | 6/1976 | Bender et al. |
| 3,979,537 A | | 9/1976 | Troyer |
| 4,031,854 A | | 6/1977 | Sprague, Jr. |
| 4,342,610 A | | 8/1982 | Ray, Jr. |
| 4,397,898 A | | 8/1983 | Ray, Jr. |
| 4,726,985 A | | 2/1988 | Fay et al. |
| 4,756,945 A | | 7/1988 | Gibb |
| 4,835,045 A | | 5/1989 | Kielmeyer et al. |
| 4,866,905 A | | 9/1989 | Bihy et al. |
| 4,972,644 A | | 11/1990 | Rumiesz, Jr. et al. |

(Continued)

FOREIGN PATENT DOCUMENTS

DE    GM 78 30 852 U1    1/1979

(Continued)

OTHER PUBLICATIONS

BC Hydro, "Band Joist Insulation" http://www.bchydro.com/powersmart/elibrary642.html?printnow, Oct. 17, 2003.

(Continued)

*Primary Examiner*—Sue A. Purvis
(74) *Attorney, Agent, or Firm*—Duane Morris LLP

(57) ABSTRACT

A method for adhering together lanes of a compressible product includes inserting a wedge device between two separate lanes of a compressible product to split apart at least a portion of the lanes of product, advancing either the wedge device or the separate lanes of the compressible product to move the wedge device and lanes relative to one another, applying an adhesive onto an inside wall of one or both of the lanes of compressible product while at least a portion of the lanes are split, and contacting the inside walls of the lanes to form a single adhered product.

16 Claims, 5 Drawing Sheets

U.S. PATENT DOCUMENTS

| | | | |
|---|---|---|---|
| 5,246,760 A | | 9/1993 | Krickl |
| 5,277,955 A | | 1/1994 | Schelhorn et al. |
| 5,331,787 A | | 7/1994 | Paulitschke et al. |
| 5,336,346 A | * | 8/1994 | Meltzer et al. ............ 156/73.4 |
| 5,362,539 A | | 11/1994 | Hall et al. |
| 5,545,279 A | | 8/1996 | Hall et al. |
| 5,567,504 A | | 10/1996 | Schakel et al. |
| 5,642,601 A | | 7/1997 | Thompson, Jr. et al. |
| 5,683,037 A | | 11/1997 | Rochman et al. |
| 5,765,318 A | * | 6/1998 | Michelsen ..................... 52/98 |
| 5,781,976 A | | 7/1998 | Stunhlbacher et al. |
| 5,849,131 A | | 12/1998 | Shaffer et al. |
| 5,900,298 A | * | 5/1999 | Syme et al. ................... 428/68 |
| 6,083,594 A | | 7/2000 | Weinstein et al. |
| 6,083,603 A | | 7/2000 | Patel et al. |
| 6,165,305 A | | 12/2000 | Weinstein et al. |
| 6,314,771 B1 | | 11/2001 | Ahrweiler et al. |
| 6,357,504 B1 | | 3/2002 | Patel et al. |
| 6,383,594 B1 | | 5/2002 | Weinstein et al. |
| 6,468,615 B1 | | 10/2002 | Weinstein et al. |
| 6,484,463 B1 | * | 11/2002 | Fay ........................... 52/404.4 |
| 6,670,011 B1 | * | 12/2003 | Weinstein et al. ............. 428/43 |
| 6,923,883 B1 | * | 8/2005 | Kissell et al. ................ 156/259 |
| 6,960,276 B1 | * | 11/2005 | Houpt et al. ................. 156/259 |
| 2001/0030018 A1 | | 10/2001 | Weinstein et al. |
| 2002/0015814 A1 | | 2/2002 | Weinstein et al. |
| 2002/0040556 A1 | | 4/2002 | Weinstein et al. |
| 2002/0136854 A1 | | 9/2002 | Smith et al. |
| 2005/0067091 A1 | * | 3/2005 | Kissell et al. ................ 156/259 |
| 2005/0067092 A1 | * | 3/2005 | Houpt et al. ................. 156/264 |

FOREIGN PATENT DOCUMENTS

| | | |
|---|---|---|
| DE | GM 79 20 480 | 11/1979 |
| DE | 31 18 597 A1 | 11/1982 |
| DE | 32 29 601 A1 | 2/1984 |
| DE | 41 08 110 A1 | 12/1991 |
| DE | G 93 02 056.2 | 8/1993 |
| DE | 197 00 373 A1 | 2/1998 |
| DE | 3118597 A1 | 2/1998 |
| DE | 44 35 317 A1 | 4/1998 |
| EP | 0 732 464 A1 | 9/1996 |
| GB | 1 358 345 | 7/1974 |
| WO | WO 98/42930 | 10/1998 |
| WO | WO 01/63063 A1 | 8/2001 |

OTHER PUBLICATIONS

BERNAL, Single-Slot Modules, http://www.bernaltech.com/content.asp?pageID=16, Jan. 6, 2004.

CERTAINTEED, "Fiber Glass Insulation", http://insulation.certainteed.com/cinsulate/cict00001p.html, Jan. 13, 2003.

CERTAINTEED, "Standard Batts and Rolls", http://insulation.certainteed.com/cinsulate/cict00101p.html, Jan. 13, 2003.

Commodore Plastics, http://www.commodoreplastics.com/content_grinder.html, Oct. 20, 2003.

CORFINE, Soft Anvil Web-Fed Rotary Die Cutter, Jan. 6, 2004.

GULLFIBER "Insulation with Gullfiber, Do-it-yourself Insulation", Dec. 1983.

GULLFIBER "M-Skiva", Mar. 1984.

GWJ Company, "Trim, Matrix, Waste Removal Systems", http://www.flexopress.com/trimremoval/trimremoval.html, Oct. 20, 2003.

Hart Co., "Soft Anvil Die Cutting System", http://www.die-cut.com/soft_anvil.html, Jun. 16, 2003.

Iowa Energy Center, "The Basement", http://www.energy.iastate.edu/efficiency/residential/homeseries/insulation/basement.htm, Oct. 17, 2003.

Johns Manville, "Formaldehyde-Free", Easy Fit™ Formaldehyde-free Perforated Thermal and Acoustical Fiber Glass Insulation, © 2002.

Johns Manville, "Formaldehyde-Free" © 2002.

Johns Manville, "Formaldehyde-Free" (Unfaced Fiber Glass Insulation/Kraft-Faced Fiber Glass Insulation) © 2002.

O'Neil Machinery Sales, "Cutter", http://www.oneilmachinery.com/detail.asp?id=5214, Oct. 22, 2003.

Precision Airconvey Corporation (PAC), "78-GB Series Granulator—Internal View", http://www.precisioncutters.com/products/granulator/model178g/inside78g/inside78g.htm, Oct. 20, 2003.

Cutter Knife, http://sundoeng.co.kr/cutterknifemain.htm, Oct. 22, 2003.

Superfos Glasuld, Glasuld Perfofilt Glass Wool Products, Glasuld Perfofilt, Jan. 1975.

\* cited by examiner

METHOD AND APPARATUS FOR ADHERING TOGETHER LANES OF COMPRESSIBLE PRODUCTS

FIELD OF THE INVENTION

The present invention relates generally to the manufacture of separable compressible products, and more particularly to a method and apparatus for adhering together separate lanes of a compressible product.

BACKGROUND

Insulation blankets formed from mineral fibers, very often fiberglass, are well known and have long been used for building insulation. The blanket is typically formed from glass fibers, which are often bound together using a resinous material.

Generally, the insulation blankets are packaged in sizes conforming to standard sizes of structural framework building cavities formed by wall studs, roof rafters, and the like. For example, the typical spacing between many framing members used in residential houses is approximately 14 ½ inches. Therefore, insulation blankets are normally manufactured to be about 15 inches in width. However, in any installation job, there are usually several occurrences where the spacing between framing members will depart from the standard width. Where this occurs, an installer will typically cut the insulation blanket with a knife to the appropriate width to fit the nonstandard-sized cavity. Not only does this make the installation more labor intensive, but it also often results in gapping or otherwise improperly fitted insulation.

Different insulation products have been developed which address the problem of nonstandard-sized cavities. A few of these products are described in U.S. Pat. No. 6,083,594 to Weinstein et al. and U.S. Pat. No. 6,468,615 to Weinstein et al. Additional separable insulation products are described in an application entitled "Separable Fibrous Insulation", application Ser. No. 10/690,295 filed on Oct. 21, 2003 in the name of Toas et al., which is incorporated by reference herein. The latter application discloses separable fibrous insulation that is initially severed into separate lanes of insulation of various widths, and thereafter the separate lanes of insulation are adhered together using an adhesive material to form a separable batt of insulation.

What is desired is an efficient, cost productive apparatus and method for adhering together separate lanes of insulation or other compressible products.

SUMMARY OF THE INVENTION

A method and apparatus for adhering together lanes of a compressible product. The method comprises inserting a wedge device between two separate lanes of a compressible product to split apart at least a portion of the lanes of product, advancing either the wedge device or the separate lanes of the compressible product to move the wedge device and lanes relative to one another, applying an adhesive onto an inside wall of one or both of the lanes of compressible product while at least a portion of the lanes are split, and contacting the inside walls of the lanes to form a single adhered product. The apparatus comprises a wedge device and a conveyor mechanism. The wedge device includes a wedge component and at least one nozzle attached to the wedge component. The nozzle is capable of administering an adhesive material to the lanes of the compressible product. The conveyor mechanism conveys the lanes of compressible product towards and past the wedge component.

DETAILED DESCRIPTION

Figure 1:
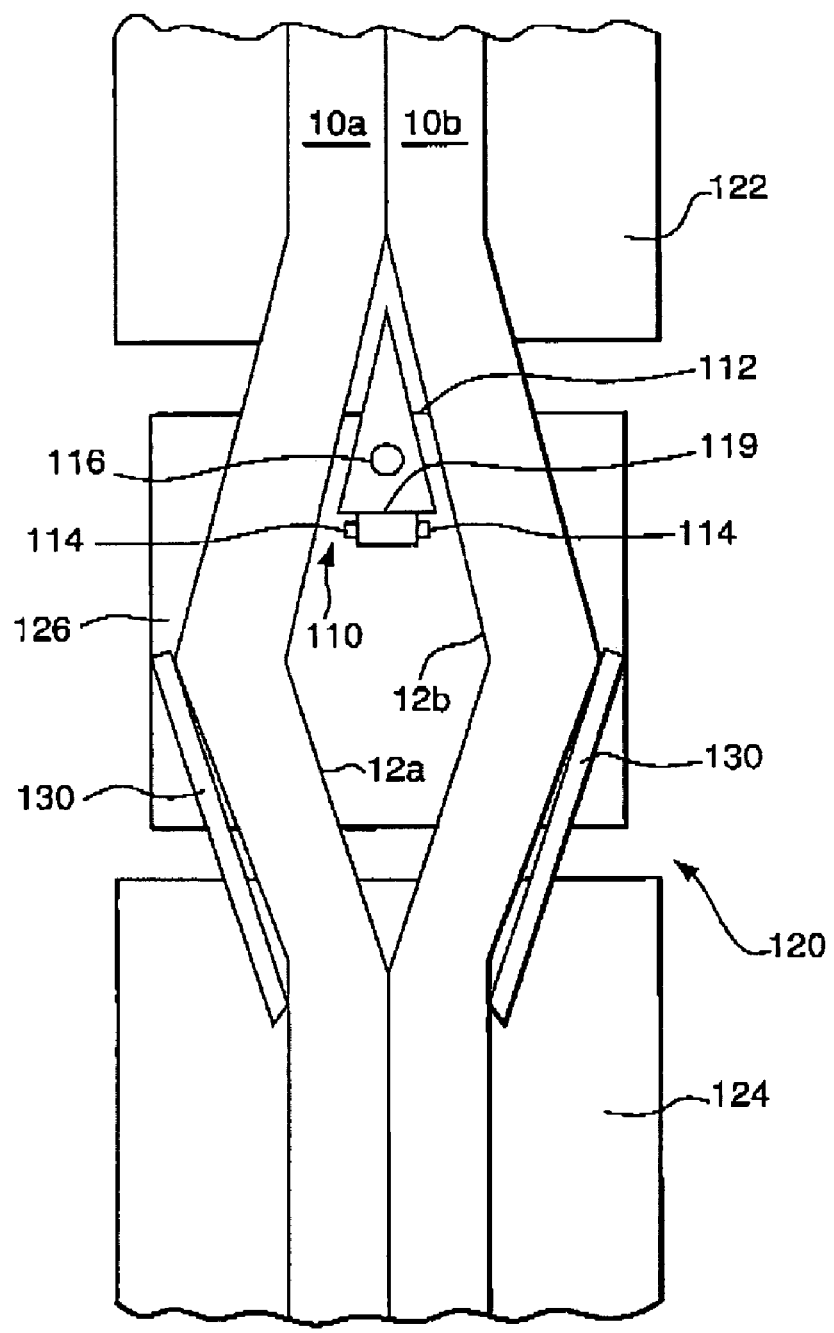
FIG. 1 is a top schematic view depicting an exemplary embodiment of an apparatus for adhering together lanes of a compressible product.

The application entitled "Separable Fibrous Insulation" filed on Oct. 21, 2003 in the name of Toas et al., having application Ser. No. 10/690,295 and assigned to CertainTeed Corporation is incorporated by reference herein in its entirety.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative th (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIG. 1 is a top schematic view of an apparatus 100 for adhering together lanes 10a,b of a compressible product. The apparatus includes a wedge device 110, a conveyor means, which may include a conveyor mechanism 120 or rollers, and a guide component 130. The compressible product may comprise a variety of compressible and/or flexible materials, but a highly preferred compressible product that may be adhered together using the apparatus and method described below is fibrous insulation, especially glass fibrous insulation. The jagged lines indicate that the conveyors 122, 124 and compressible product 10a, 10b extend in both the upstream and downstream directions.

Figure 3:
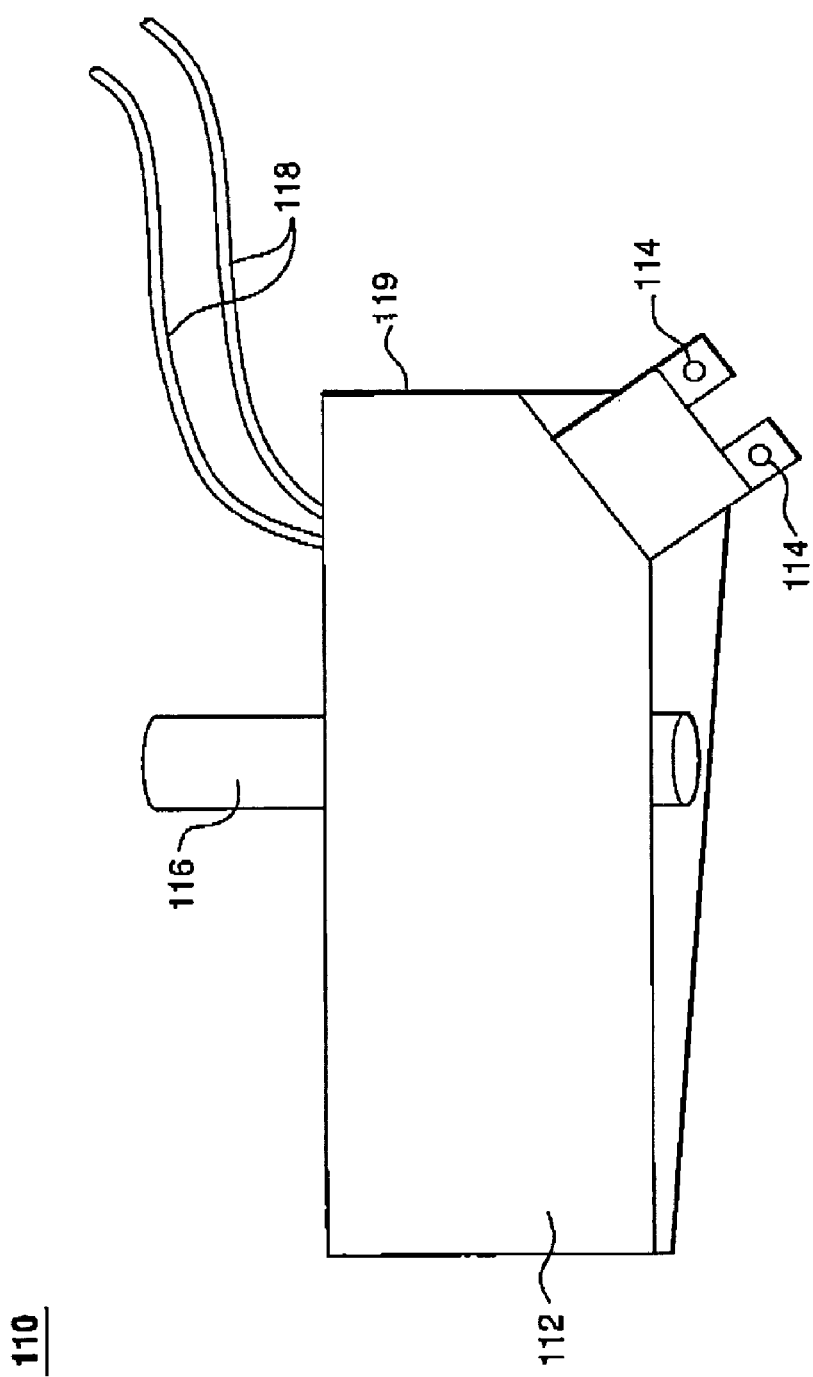
FIG. 3 is a side view of an exemplary wedge device.

Referring to FIG. 3, the wedge device 110 includes a wedge component 112, at least one nozzle 114 for applying an adhesive material onto the inside walls 12a, 12b of lanes 10a, 10b of a compressible product, and an attachment component 116. The wedge component 112 is preferably triangular in shape, but may also be oval or teardrop-shaped, or a variety of other shapes that facilitate the separation of the lanes. The wedge component 112 separates the individual lanes 10a, 10b of compressible product so that an adhesive may be applied to the inside wall 12a, 12b of one or both of the adjacent lanes of compressible product. The wedge component is preferably formed of metal, but may be formed of other materials, such as plastic, for example. Preferably the wedge component 112 includes an attachment component 116 for attachment to a support, as described below.

Referring to FIGS. 1 and 3, the wedge device 110 includes nozzles 114 preferably connected to a back edge 119 of the wedge component 112. The nozzles 114 are aimed at respective inside walls 12a, 12b of the lanes of compressible product for application of the adhesive material. The wedge device may include one nozzle (applying adhesive to only one sidewall of one lane of product), two nozzles (each applying adhesive to a respective inside wall 12a, 12b of a lane of compressible product) or more than two nozzles. The nozzles may be adjustable or pivotable, for example along the X and/or Y axis, to allow application of the adhesive material at various heights on the inside walls of the lanes. The nozzles may also be connected to a control mechanism, such as a programmable controller 113 (FIG.3), which may operate the nozzles by, for example, turning the nozzles off and on and/or directing the direction of spray of the adhesive material. Preferably, the nozzles are connected to one or more conduits, such as hoses 118, which supply the adhesive material to the nozzles from an adhesive storage supply.

Preferably the wedge device 110 is connected via the attachment component 116 to a support (not shown) that holds the wedge device 110. Preferably the support is capable of raising and lowering the wedge device 110 for engaging and disengaging the lanes 10a, 10b of compressible product. The support may also be capable of slidably supporting the wedge device 110 such that the wedge device can move parallel to and between the slit lanes 10a, 10b of compressible product to separate and apply glue to the lanes.

In the embodiment shown in FIG. 1, conveyor mechanism 120 is disposed below the wedge device 110 and carries the lanes 10a, 10b of compressible product towards and past the wedge device 110. The conveyor mechanism 120 may be, for example, one or more conveyor belts or a series of rollers. In the exemplary embodiment shown in FIG. 1, the conveyor mechanism includes two conveyor belts 122, 124 and a plate 126. Conveyor belt 122 advances the lanes of compressible product towards the plate 126 and conveyor belt 124 pulls the lanes of compressible product from the plate 126. In an alternative embodiment, plate 126 may be replaced by one or more rollers.

Guide component 130 is disposed proximate to the wedge device 110 and acts to guide the divided lanes 10a, 10b of product together, so that the adhesive may adhere the separate lanes of product together. Guide component 130 may be comprised of a set of plates (as shown) or rollers, for example, or any other mechanism capable of merging the adjacent lanes of product. As shown in FIG. 1, guide component 130 is preferably located behind the wedge device 110, but may be located adjacent to wedge device 110. When the wedge device 110 remains stationary, the guide component 130 also preferably remains stationary. However, in an embodiment wherein the wedge device 110 moves to separate the lanes of compressible product, preferably the guide component 130 moves in tandem with the wedge device 110 to facilitate the merging of the glued lanes 10a, 10b.

Figure 2:
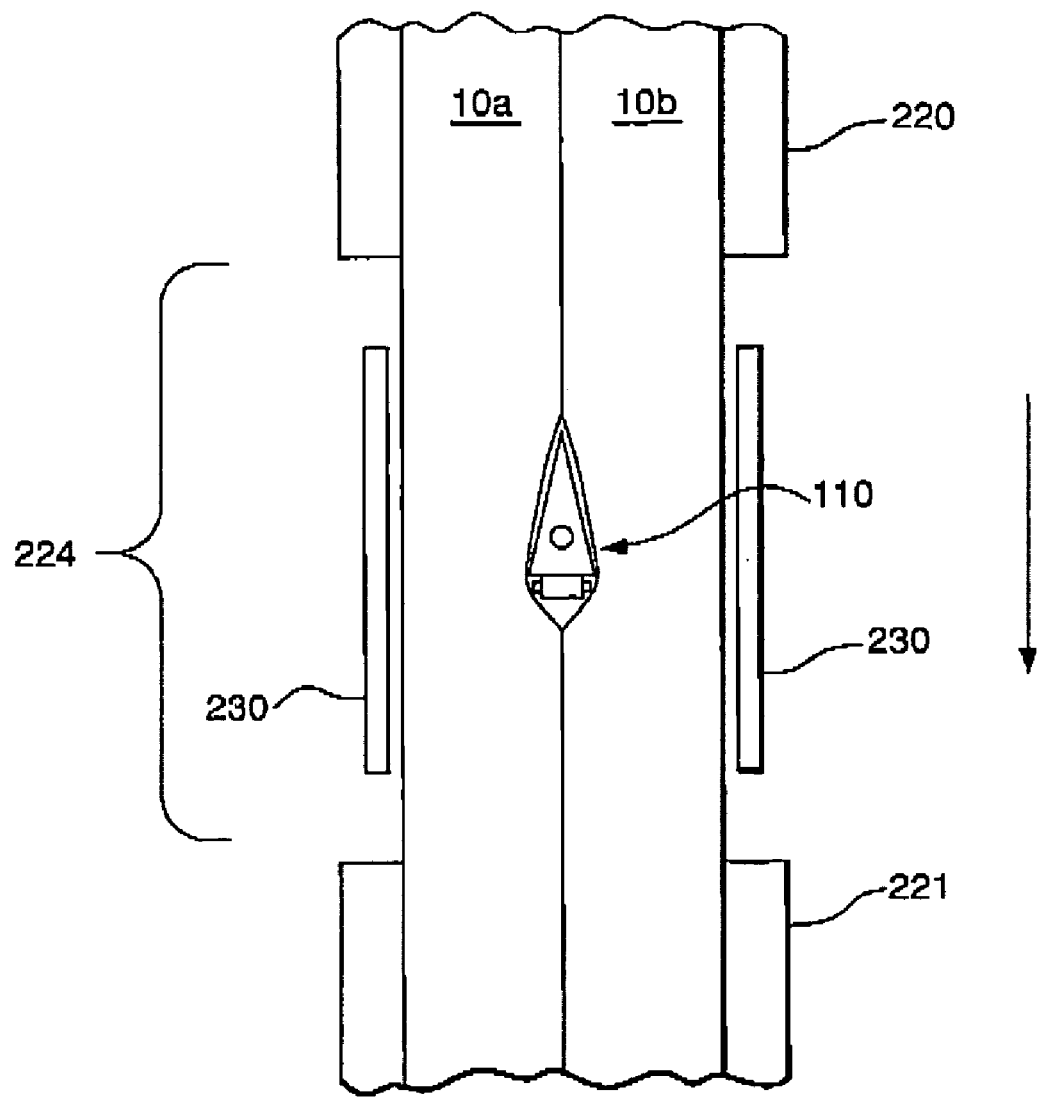
FIG. 2 is a top schematic view depicting another exemplary embodiment of an apparatus for adhering together lanes of a compressible product.

FIG. 2 is a top schematic view of another exemplary embodiment of an apparatus 200 for adhering together lanes 10a, 10b of a compressible product. The apparatus includes a wedge device 110, a conveyor mechanism 220, 221 and a guide component 230.

The wedge device 110 and support (not shown) are the same as described above with respect to the apparatus 100 of FIG. 1.

The insulation is carried on conveyors in a continuous form for several hundred feet until it is chopped into batts or rolls. The carrying and pulling is done by a series of conveyors under the insulation and a few driven pinch rollers above the conveyors. The conveyors or rollers apply in-plane forces (i.e., shear or tangential forces) against the undersurface of the compressible product upstream and downstream of the wedge device 110. In some areas there may be pinch rollers on top of the conveyor, also providing a force on the upper surface. One can slit and reattach (e.g., using glue) non-continuous insulation by carrying it through the slitting and gluing system with a series of conveyors.

The conveyor mechanism 220, 221 of exemplary apparatus 200 is located beneath the lanes 10a, 10b of compressible product to advance the lanes towards the wedge device 110 where they can be at least partially separated to allow for application of the adhesive material. The conveyor mechanism 220 can be any device capable of advancing the lanes of compressible product, such as a belt, a chain, or rollers, for example. In this embodiment, the lanes of compressible product may be situated upon a stationary surface. The product is advanced by pulling alone or optionally by pulling in combination with carrying on a conveyor or rollers, and may also include pinch rollers on top in some areas. Preferably, the lanes of insulation are carried over a section 224 of the line with no conveyor by using conveyors 220 and 221 under the lanes, before and after the stationary section 224. The first conveyor 220 conveys or carries the insulation from below, and the second conveyor 221 pulls the insulation from below. Therefore, two conveyors 220 and 221 can be used in tandem and may include conveyor belts or a series of rollers. The separation of lanes, application of adhesive, and re-joining of lanes may also occur in an area where the insulation is supported by a conveyer belt, chain, or rolls.

Guide component 230 of apparatus 200 is preferably disposed adjacent the wedge device 110 as shown in FIG. 2. Guide component 230 may be comprised of a set of plates (as shown) or rollers, for example, or any other mechanism capable of merging the adjacent lanes of product. In this embodiment, preferably the guide component 230 keeps the bottom of the lanes 10a, 10b pressed together while the wedge device 110 creates an opening for applying the adhesive material. As described above with respect to apparatus 100, when the wedge device 110 remains stationary, the guide component 230 also preferably remains stationary. However, in an embodiment wherein the wedge device 110 moves to create an opening in the lanes of compressible product, preferably the guide component 230 moves in tandem with the wedge device 110 to rejoin the glued lanes of compressible product 10a, 10b.

Figure 4:
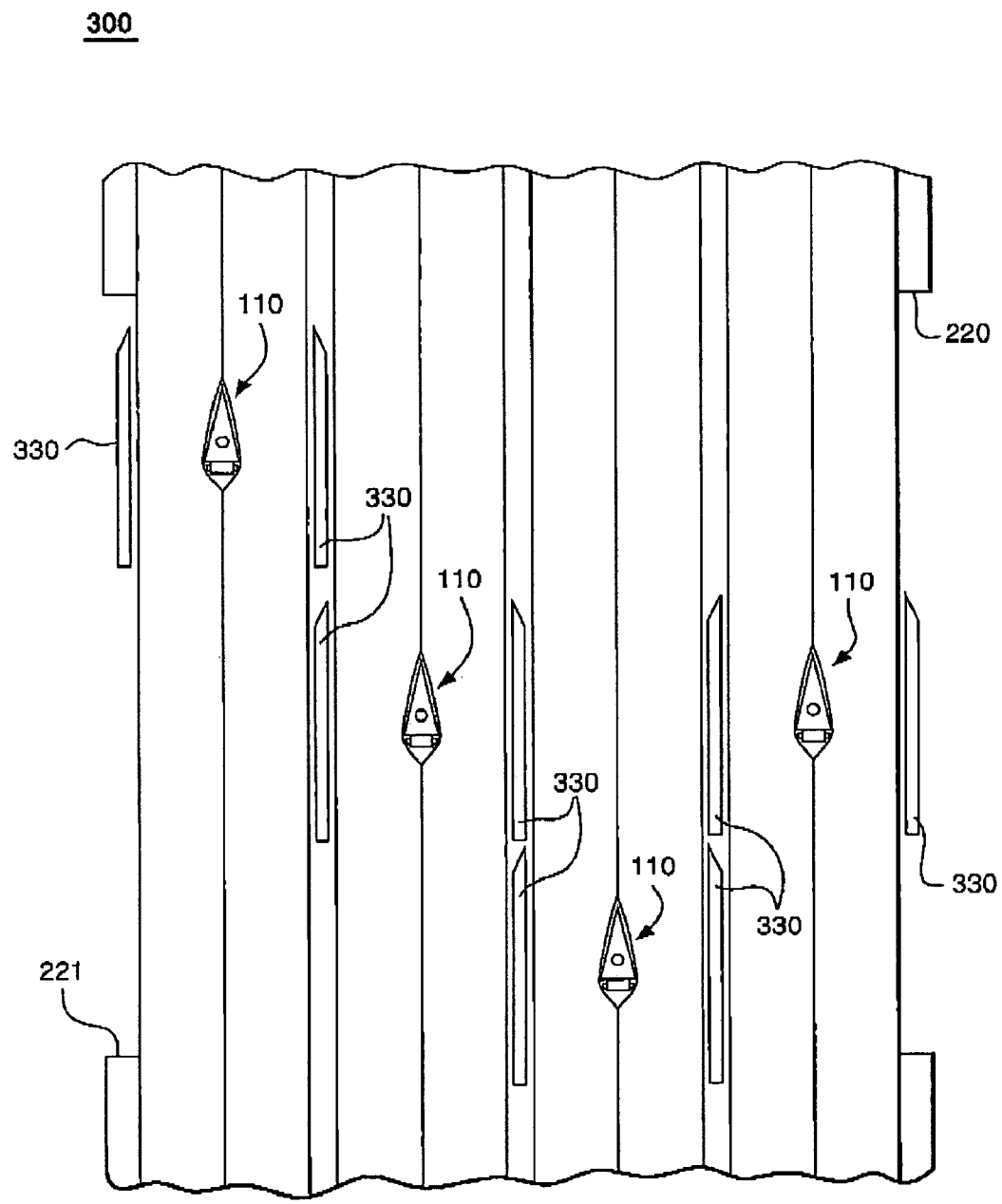
FIG. 4 is a top schematic view depicting another exemplary embodiment of an apparatus for adhering together lanes of a compressible product.

Referring to FIG. 4, apparatus 300 includes a plurality of wedge devices 110, a conveyor mechanism 320, and a plurality of guide components 330. The wedge devices 110 and guide components 330 are located in parallel for simultaneously adhering together multiple lanes of compressible product. As shown in FIG. 4, preferably the sets of wedge devices 110 and guide components 330 are not located directly adjacent to one another, but rather each set is located at a different point along the length of the lanes of product. Although shown in FIG. 4 as having a construction similar to that of FIG. 2, apparatus 300 may also have the construction described above with respect to FIG. 1.

Figure 5:
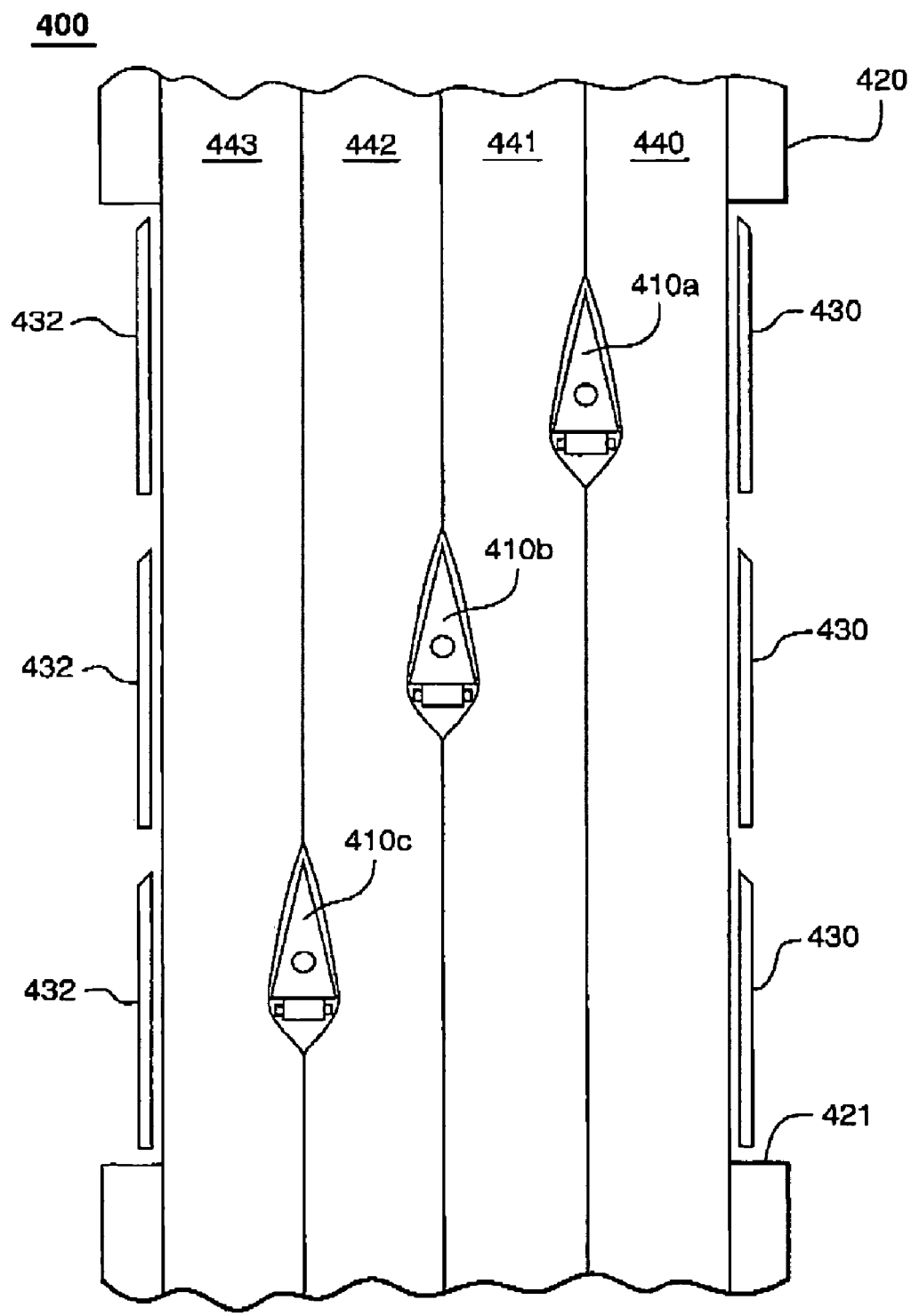
FIG. 5 is a top schematic view of another exemplary embodiment of an apparatus for adhering together lanes of a compressible product.

Another exemplary embodiment of an apparatus 400 for adhering together lanes of compressible product is shown in FIG. 5. Apparatus 400 is advantageously used for adhering together four lanes of compressible product to form a single product, such as fifteen inch wide separable fibrous insulation, as is described in the above-referenced Ser. No. 10/690,295 application, which has been incorporated by reference herein. Apparatus 400 includes three wedge devices 410a–c, a conveyor mechanism 420, and two sets of guide components 430, 432. In this embodiment, each of the wedge devices 410a–410c are between the two sets of guide components 430, 432. As shown in FIG. 5, preferably the wedge devices 410a–410c are not located directly adjacent to one another, but rather are located at different points along the length of the lanes of product 440, 441, 442, 443. In operation, the leading wedge 410a would first adhere together lanes 440 and 441. Thereafter, intermediate wedge 410b would adhere together lanes 441 and 442. Finally, the final two lanes of product 442 and 443 would be adhered together by trailing wedge 410c to form a separable four lane product. Although shown employing three wedge devices, one, two or more than three wedge devices could also be employed depending on the number of lanes desired in the final product. Although shown in FIG. 4 as having a construction similar to that of FIG. 2, apparatus 400 may also have the construction described above with respect to FIG. 1.

The above described exemplary embodiments of the device 110 and apparatus 100, 200, 300 may advantageously be employed in conjunction with current or new methods for forming fibrous insulation. Preferably, such device and apparatus would be used after slitting the insulation into the desired widths and prior to packaging the insulation into batts or rolls.

According to another aspect, a method of adhering together lanes of a compressible product comprises (a) inserting a wedge device between two separate lanes of a compressible product to separate at least a portion of the lanes of product, (b) advancing either the wedge device or the separate lanes of the compressible product to move the wedge device and lanes relative to one another, (c) applying an adhesive onto an inside wall of one or both of the lanes of compressible product while at least a portion of the lanes are split, and (d) contacting the inside walls of the lanes to form a single adhered product.

In some embodiments, the step of inserting the wedge device 110 includes using a support to lower the wedge device between the lanes 10a,b of compressible product.

In some embodiments, the step of advancing includes using a conveyor mechanism 120, 220, 320 to advance the lanes 10a, 10b of product toward the wedge device 110. The conveyor mechanism may be located beneath the lanes of product (e.g., a conveyor belt or series of rollers, see FIG. 1), preferably before and after the wedge device 110 (see FIGS. 2 and 4).

In some embodiments, the step of applying an adhesive onto an inside wall 12a, 12b of one or both of the lanes 10a, 10b of product includes using at least one nozzle 114 attached to the wedge device 110 to spray the adhesive material onto the inside walls 12a, 12b. The nozzles 114 may be adjustable, or rotatable, to allow the adhesive material to be applied to the inside walls 12a, 12b at different heights. The nozzles 114 may be operated manually or may be controlled by a programmable controller. The controller may signal the nozzles to turn off and on and/or may control the placement of the adhesive material by adjusting or rotating the nozzles. The nozzles 114 may apply the adhesive material in a straight line or in a pattern such as a figure eight, for example.

In some embodiments, the step of contacting the inside walls 12a, 12b of the lanes to form a single adhered product includes using guide components 130, 230, 330 such as plates or rollers, to press against the outside walls of the lanes 10a, 10b of compressible product.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for adhering together lanes of a compressible product comprising:
    (a) inserting a respective wedge device between adjacent separate lanes of a compressible product in each of a plurality of pairs of lanes simultaneously to split apart at least portions of at least three lanes of product;
    (b) advancing either the wedge devices or the separate lanes of the compressible product to move the wedge devices and lanes relative to one another;
    (c) applying an adhesive onto an inside wall of one or both of the portions of each pair of adjacent lanes of compressible product while the portions of the lanes are split; and
    (d) pressing against outside walls of two of the at least three lanes of product using respective plates or respective rollers near each respective wedge device to guide the at least three lanes into contact with one another causing the inside walls of the at least three lanes to join to form a single adhered product.

2. The method of claim 1, wherein the step of applying the adhesive comprises spraying the adhesive onto one or both of the adjacent inside walls of the at least three lanes using at least two spray nozzles.

3. The method of claim 2, wherein the at least two spray nozzles are attached to respective ones of the wedge devices.

4. The method of claim 1, wherein the ctop of contacting the inside walls of the at least three lanes join each other simultaneously.

5. The method of claim 1, wherein the plates or rollers are located substantially beside the respective wedge devices.

6. The method of claim 1, wherein the plates or rollers are located behind the respective wedge devices.

7. The method of claim 1, further comprising pivoting the nozzles to direct the adhesive during step (c).

8. The method of claim 1, further comprising turning the nozzles off and on during step (b).

9. The method of claim 1, wherein step (b) includes moving the wedge devices parallel to and between the lanes of compressible product to separate and apply glue to the lanes.

10. An apparatus for adhering together three or more lanes of a compressible product comprising:
    a plurality of wedge devices, each including a wedge component and at least one nozzle attached to said wedge component, wherein said nozzle is capable of applying an adhesive material to inside walls of respective lanes in successive pairs of lanes of the compressible product;

a conveyor means for conveying the three or more lanes of compressible product towards and past the wedge components simultaneously; and plurality of plates or rollers, including respective plates or respective rollers disposed near each respective wedge device for pressing against outside walls of two of the at least three lanes of product to guide the at least three lanes into contact with one another. causing the inside walls of the lanes of compressible product with adhesive thereon together to form a single product.

11. The apparatus of claim 10, wherein the conveyor means advances the lanes of compressible product towards and past the wedge components by applying in-plane forces against an undersurface of the compressible product upstream and downstream of the wedge components.

12. The apparatus of claim 10, wherein the conveyor means is disposed below the wedge components and lanes of compressible product and carries the lanes of compressible product towards and past the wedge components.

13. The apparatus of claim 10, wherein:
the conveyor means is located beneath the lanes of compressible product, and
the plates or rollers we located adjacent to a respective first and second side of the conveyor mechanism.

14. The apparatus of claim 10, further comprising a programmable controller that turns the nozzles off and on while the conveyor means conveys the three or more lanes of compressible product.

15. The apparatus of claim 10, Rather comprising a programmable controller that diiects the direction of spray of the adhesive material while the conveyor means conveys the three or more lanes of compressible product.

16. The apparatus of claim 10, wherein the plurality of wedge devices are located at different points along the length of the lanes of the compressible product.

* * * * *

UNITED STATES PATENT AND TRADEMARK OFFICE
CERTIFICATE OF CORRECTION

PATENT NO. : 7,060,148 B2  Page 1 of 1
APPLICATION NO. : 10/779181
DATED : June 13, 2006
INVENTOR(S) : Murray S. Toas, Dave Suda and Thomas A. Cuthbertson It is certified that error appears in the above-identified patent and that said Letters Patent is hereby corrected as shown below:

Column 6, line 44, delete "the ctop of contacting".

Column 7, line 4, before "plurality", insert -- a --.

Column 8, line 4, delete "we" and insert -- are -- therefor.

Column 8, line 10, delete "Rather" and insert -- further -- therefor.

Column 8, line 11, delete "dijects" and insert -- directs -- therefor.

Signed and Sealed this

Fifth Day of August, 2008

JON W. DUDAS
*Director of the United States Patent and Trademark Office*